Figure 1:
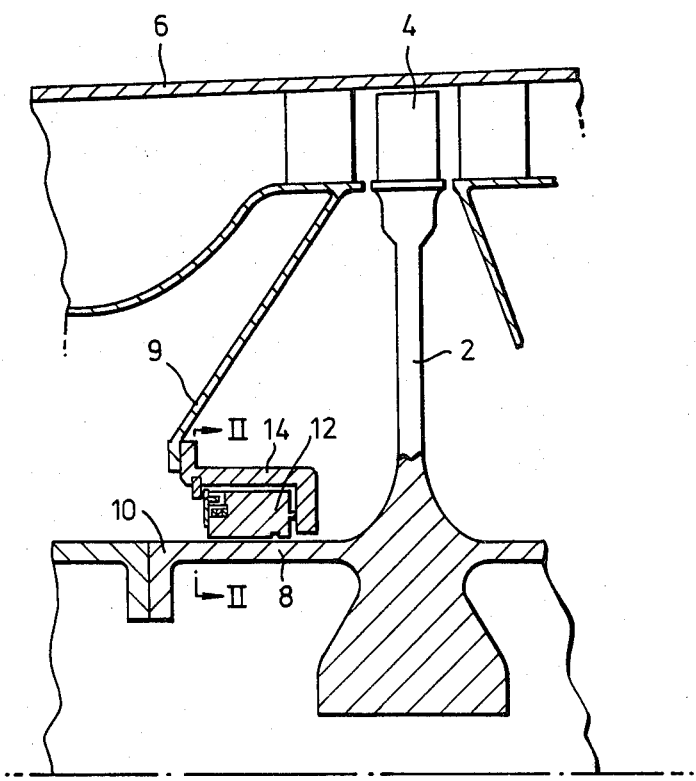

United States Patent [19]

Sargent et al.

[11] 4,405,134
[45] Sep. 20, 1983

[54] NON-CONTACTING GAS SEAL FOR RELATIVELY ROTATING PARTS

[75] Inventors: Raymond F. Sargent; Paul Newman, both of Bristol, England

[73] Assignee: Rolls-Royce Limited, London, England

[21] Appl. No.: 341,086

[22] Filed: Jan. 20, 1982

[30] Foreign Application Priority Data

Jan. 31, 1981 [GB] United Kingdom ............... 8103023

[51] Int. Cl.³ .......................................... F16J 15/16
[52] U.S. Cl. ...................................... 277/3; 277/27; 277/81 S; 277/96.1; 277/199
[58] Field of Search ................. 277/3, 27, 81 S, 199, 277/96.1

[56] References Cited

U.S. PATENT DOCUMENTS

| | | | |
|---|---|---|---|
| 2,402,033 | 6/1946 | Flinn | 277/96.1 |
| 2,828,983 | 4/1958 | Hunt | 277/81 S |
| 2,921,806 | 1/1960 | Carter | 277/81 S |
| 3,305,241 | 2/1967 | Hart | 277/199 |
| 3,606,349 | 9/1971 | Petrie | 277/27 |
| 4,082,296 | 4/1978 | Stein | 277/3 |
| 4,114,900 | 9/1978 | Wiese | 277/27 |

Primary Examiner—Robert I. Smith
Attorney, Agent, or Firm—Parkhurst & Oliff

[57] ABSTRACT

In a non-contacting gas seal between static and rotatable components of a gas turbine engine, a seal ring (12) (FIG. 4) is composed of a plurality of overlapping segments (16) which co-operate to define a sealing face (15). The segments are located in a housing (14) preferably on the static component with the sealing face (15) confronting a sealing face (10) on the rotating component the arrangement being such that in operation the segments lift away from the rotating component to ride on a gas film leaving a very small sealing clearance therebetween.

A secondary seal must be formed between the seal ring and the housing to avoid leakage around the seal ring and this is achieved by a narrow sealing land (23) on the low pressure side-face of each segment being urged into contact with a side-face (22) of the housing by the higher pressure fluid on the opposite side-faces of the segments. The narrow land provides a fulcrum on each segment which allows the segments to tilt so that contact of each land with the side-face of the housing does not put any constraint on the alignment of the confronting sealing faces even where the sealing face and the side-face of the segment may not be exactly at right angles.

At least one of the overlapping surfaces of the segments is also contoured to provide a second fulcrum to facilitate tilting of the segments.

3 Claims, 6 Drawing Figures

NON-CONTACTING GAS SEAL FOR RELATIVELY ROTATING PARTS

DESCRIPTION

The present invention relates to non-contacting seals, and in particular relates to non-contacting gas seals between static and rotatable components in machines, for example, turbo-machines. By the expression non-contacting seals is meant that type of seal in which confronting sealing members on the static and rotatable components run in close proximity to each other to define a clearance which provides a resistance, but not a complete blockage, to flow of fluid between the two components.

In U.K patent specification No. 1,540,843 there is described a rubbing seal for sealing fluid flow between a rotatable component and a housing containing a fluid. Reference is made in this specification, however, to rubbing seals of the segmented type in which seal segments located in the housing have sealing faces confronting a sealing face on the rotatable component, and in which the seal segments "surf-board" on the fluid causing them to be lifted from the rotatable member. The specification also makes general reference to a gas seal in which the seal is configured to produce a decrease in fluid film thickness in the direction of rotation of the rotatable member to deliberately generate such lifting forces.

Such a seal would then operate as a non-contacting seal. Leakage of gas around the back of the sealing seal is prevented by a secondary seal formed between contacting side-faces of the housing and the sealing segments.

In order to ensure that rubbing contact does not occur under any circumstances during operation with such a seal, it is a critical requirement that the confronting faces on the segments and the rotatable component, between which lift forces in the fluid are generated, remain parallel in the direction normal to the direction of their relative rotation. However, the confronting lifting faces and the confronting side-faces are at right angles to each other, and because the confronting side-faces forming the secondary seal will be preferentially urged into engagement by the effect of the higher pressure fluid on the opposite side-faces, any mis-alignment between any of the faces at right angles will prevent the establishment of said parallel relationship of the lifting faces.

It is an object of the present invention to provide such a non-contacting fluid seal in which said mis-alignments between the different faces can be accommodated without affecting the parallel arrangement of the lifting faces.

According to the present invention, a non-contacting seal for reducing fluid flow between relatively rotatable components of a machine comprises a seal ring having a sealing face, the seal ring being adapted to be disposed, in operation, on one of the components with its sealing face confronting a co-operating sealing face on the other component to form a seal therebetween means for locating the seal ring in a housing with freedom of movement in a direction normal to said sealing faces, the seal ring being formed in a plurality of segments, each having a face which includes a sealing area and a lifting area said sealing area forming part of the sealing face of the ring, and further means for providing a seal between the ring and the housing, characterised in that:
the lifting area of each segment extends from the leading end to the trailing end thereof,
the leading end of each segment has a surface arranged to overlap a surface at the trailing end of an adjacent segment in such a manner as to provide a step between the ends of the adjacent segments whereby, in use, a tapering gap is produced between at least the lifting area of each segment face and the confronting sealing face of said other member, which converges towards the trailing end of each segment,
the means for forming a fluid seal between the seal ring and the housing comprises a narrow land on that side-face of each of the segments which lies on the lower pressure side of the seal ring, said land contacting a confronting sealing face on the housing and providing a fulcrum to allow tilting of each pad relative to the housing, and at least one of the overlapping surfaces of the segments is contoured to provide a second fulcrum to allow said tilting to take place.

By this means neither the faces of the secondary seal nor the overlapping surfaces of the segments put any restraint on the alignment of the confronting lifting surfaces when the seal ring is exposed to the fluid pressure in operation.

In the case of a radial seal, i.e. where the lifting faces extend both axially and circumferentially and the side-faces are radial, the narrow land extends chordally along the length of each segment. Where the seal is a face seal, however, and the lifting faces are radial, the narrow land extends circumferentially around each segment.

Figure 2:
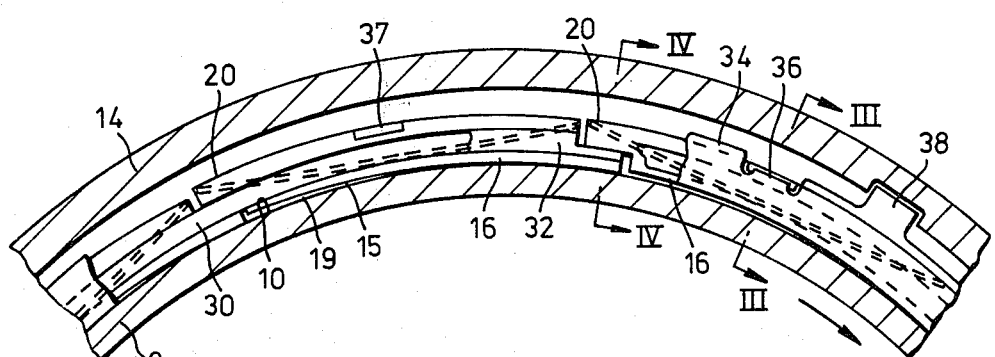
Figure 3:
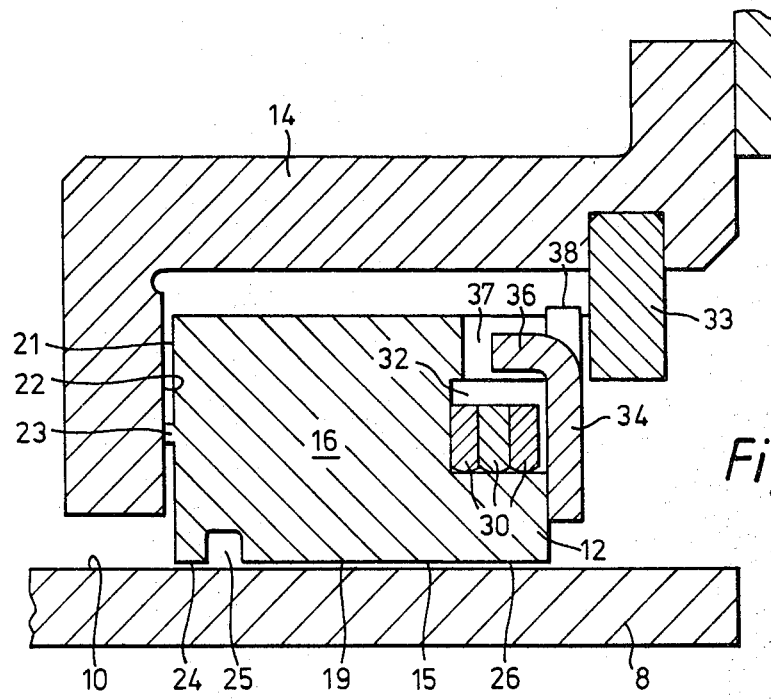
Figure 4:
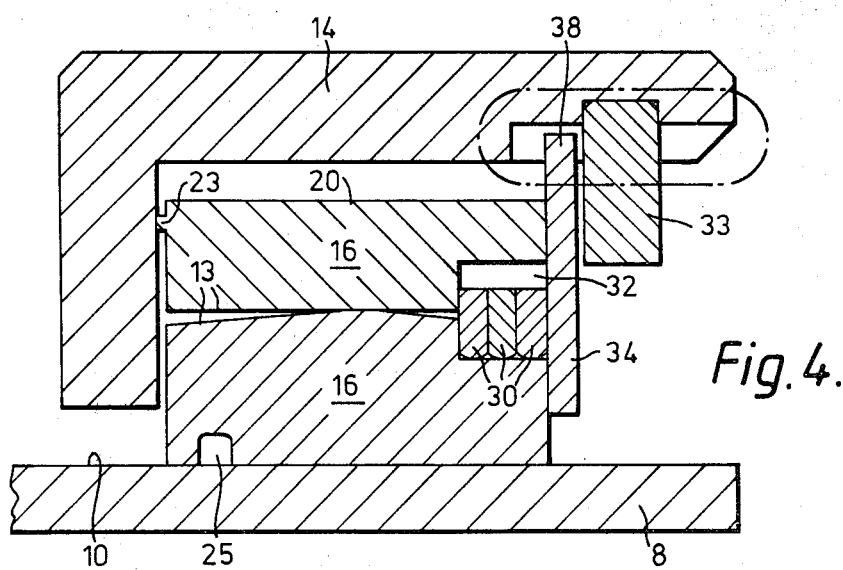
Figure 5:
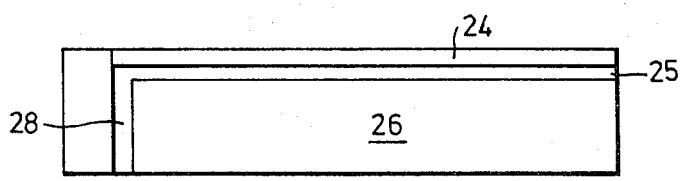
Figure 6:
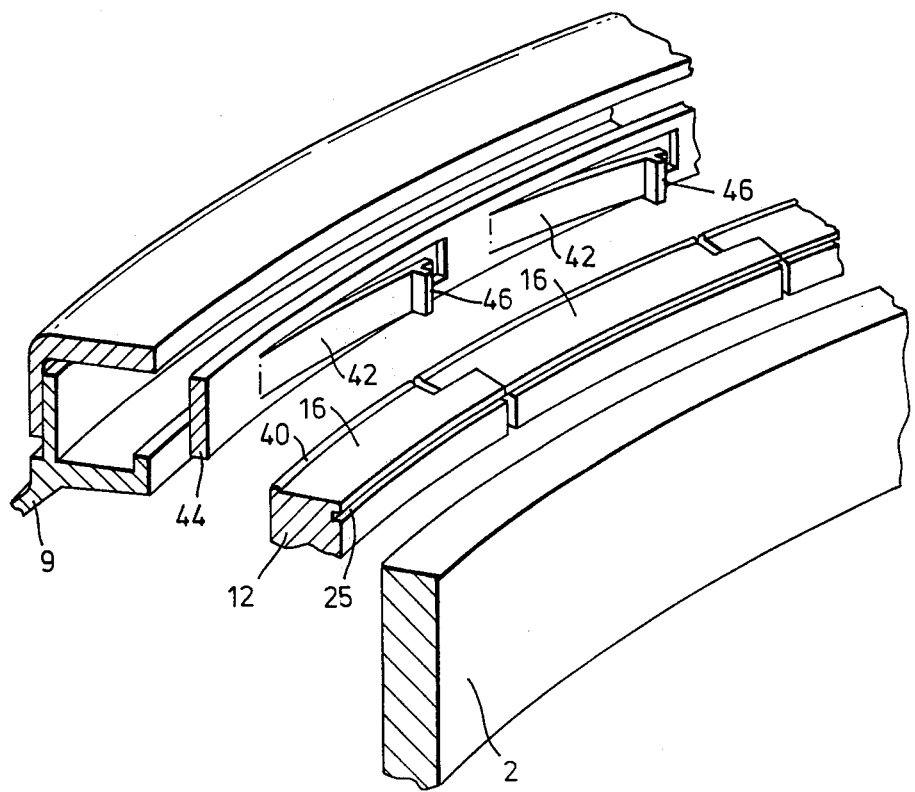

Examples of the invention will now be more particularly described with reference to the accompanying drawings in which:

FIG. 1 is a part sectional elevation of a turbine stage of a gas turbine engine incorporating a seal according to the present invention, FIG. 2 is a view on the line II—II of FIG. 1 (not to scale), FIG. 3 is an enlarged view on the line III—III of FIG. 2, FIG. 4 is an enlarged view of the line IV—IV of FIG. 2, FIG. 5 is a plan view of the sealing face of one of the segmental pads, and FIG. 6 is an exploded perspective illustration of a face seal made in accordance with the invention.

Referring now to the drawings, there is shown in FIG. 1 a turbine rotor of a gas turbine engine including a rotor disc 2 on the periphery of which are mounted a plurality of turbine blades 4. The disc is rotatable within a static casing 6 and carries an axially extending cylinder 8 which constitutes the rotating part of a non-contacting gas seal which is designed to minimise leakage of high pressure working fluid past the stator structure 9. The cylinder 8 has a radially outwardly facing face 10 which is prepared as a sealing face by accurate machining and is preferably coated with a coating of low friction co-efficient.

A seal ring 12 is provided within an annular housing 14 which is bolted to the adjacent stator structure 9. The ring 12 substantially fills the gap between the stator structure 9 and the cylinder 8 to form a seal.

Referring now to FIGS. 2 to 5 it can be seen that the seal ring is divided into segments which co-operate to define a radially inwardly facing face 15. The leading end 20 of each segment is arranged to overlap the trailing end of the preceding segment and the step heights of the overlapping parts are arranged to be such that said leading end is held away from the face 10 of the cylinder 8 by a small amount (e.g. 0.004 ins.) whereby a tapering gap 19 is created between the face 15 of the seal ring and the face 10. The height of the tapering gap decreases in the direction of rotation of the rotor disc 2.

Each segment has a side-face 21 which maybe machined flat to contact a side-face on the housing to form a seal between the housing 14 and the seal ring 12. Contact is maintained between the two side-faces by the pressure fluid acting on the opposite side-face.

In practice, machining inaccuracies make it difficult to achieve true right angles between the sealing face 15 and the side-face 21 of each segment and also between the sealing faces 10 and the side-face 22 of the housing. Thus mis-alignments between these faces at right-angles can occur, and since the side-face 21 is urged into contact with the side-face 22 of the housing by the high pressure gas, these two faces tend to line up leaving any mis-alignments to be reflected in a relative tilting between the lifting faces 10 and 15. As the amount of lift generated by the gas in the tapering gap between the lifting faces is critically dependent on the faces remaining parallel in the transverse direction, mis-alignment can cause rubbing contact to occur between these faces. Thus in the preferred embodiment, as shown in FIGS. 2, 3 and 4, a chordal land 23 is provided across the side-face 21 of each segment and which stands proud of the side-face by a small amount, for example 0.010–0.020 ins. The land 23 acts as a fulcrum about which each segment can tilt to maintain parallelism between the two lifting faces even though the angles between the faces 15 and 21 or between faces 10 and 22 may not be true right angles.

As shown in FIG. 4, the lower of the two overlapping surfaces of the segments is bevelled to provide a further small fulcrum to allow slight tilting between the segments to take place.

The segments 16 are also urged towards the face 10 of the cylinder 8 by high pressure fluid which acts on the radially outwardly facing surfaces of the segments. As, in a gas turbine embodiment, this high pressure air is derived from the engine compressors, its pressure is dependent on engine speed. Thus when the engine is running at low speed and the generated air film pressure under the segments is low, so also is the air pressure on the back of the segments, so that the seal is to this extent self-balancing. This is particularly beneficial on start up when the segments are in contact with the flange because there is virtually no air pressure on the backs of the segments.

Since the pressure on the back of the segments is acting against the lifting force on the segments, it is necessary that the lift force generated in operation always slightly exceeds the gas pressures urging the segments radially inwards. To this end the face 15 of each segment is divided by a circumferentially extending channel 25 into a sealing area 24 and a lifting area 26. A recess 28 allows high pressure working fluid from the high pressure side of the seal to reach the channel 25 to balance the pressures of both sides of the lifting area 26 to increase the lifting power of the seal. Lifting force is generated by the fluid in the gap 19 being dragged into the decreasing volume towards the trailing end of the segment due to the rotation of the sealing face 10. For convenience the sealing area has its surface formed simultaneously with that of the lifting area so that both have the same curvature and define identical tapering gaps with the sealing face 10. However, it may be desirable to form the surface of the sealing area to a different shape so that it stands proud of the surface of the lifting area in order to further reduce the fluid leakage through the gap.

Spring rings 30 are provided in aligned recesses 32 cut into each segment 16. These may be designed to produce radially inward, outward or even zero spring force on the segments depending on the balance, or lack of balance between the radially inward force of the high pressure gas on the back of the segments and the radially outward lifting force generated in the tapering gap. In addition, these rings 30 serve to locate the segments 16 radially to hold them in place when the seal is removed from the cylinder 8. The segments are located axially by a circlip 33.

To optimise configuration of the segments to produce maximum lift it has been found that the length to width ratio of the segments should be between 3:1 and 2:1.

In order to prevent the segments from moving too far independently in the circumferential direction, a dogged ring 34 is provided which has spaced dogs 36 thereon, one for each segment, and which fit into cut-outs 37 in the segments. Thus during any vibration of the rotor disc 2, or any other circumstance causing eccentric movement of the cylinder 8 relative to the housing 14, radially outward movement of any one of the segments caused by an increase in fluid pressure in the film beneath it will cause the ring to move outwardly. This in turn will cause all of the segments to move in the same direction following the movement of the cylinder 8 and maintaining the gap profile between each segment and the cylinder. The ring 34 is prevented from rotation relative to the housing by an anti-rotation dog 38, and this in turn prevents relative rotation between the seal ring and the housing. The dog 38 is shown for convenience in the insert within the dotted area of FIG. 4 which is a partial cross-section through the dog 38.

The embodiment described is a radial seal for sealing a radial gap between cylindrical surfaces. However, the present seal construction is easily modified to act as a face seal as shown in FIG. 6 in which similar parts are given the same reference numerals. In this embodiment the segments 16 of the seal ring 12 are located, for example, in an annular housing on adjacent fixed structure 9 which has an axially facing opening to accommodate axial movements of the sealing ring caused by relative axial movements of the turbine disc and the adjacent fixed structure.

In this embodiment the design of the segments is almost the same as in the previous embodiments except that the narrow sealing land which forms the secondary seal is circumferential and is shown at 40.

The locating means is shown as including light spring members 42 which are cut out from a spring ring 44 and lightly urge the segments 16 towards the rotor disc for starting purposes, and include dogs 46 which constitute the means for maintaining the relative circumferential positions of the segments.

Although the invention has been described with reference to seals between static and rotating parts of a machine, the principle of operation would be the same if the relative rotation was produced by both of the parts rotating. Thus, for example, a seal according to the present invention could act as an intershaft seal between contra-rotating or even para-rotating shafts. In such embodiments, however, consideration would have to be given to the centrifugal forces acting on the segments.

We claim:

1. A non-contacting seal for reducing fluid flow between relatively rotatable components of a machine comprises a seal ring having a sealing face, the seal ring being adapted to be disposed, in operation, on one of the components with its sealing face confronting a co-operating sealing face on the other component to form a seal therebetween, means for locating the seal ring in a housing with freedom of movement in a direction normal to said sealing faces, the seal ring being formed in a plurality of segments, each having a face which includes a sealing area and a lifting area said sealing area forming part of the sealing face of the ring, and further means for providing a seal between the ring and the housing, characterised in that:

the lifting area of each segment extends from the leading end to the trailing end thereof, the leading end of each segment has a surface arranged to overlap a surface at the trailing end of an adjacent segment in such a manner as to provide a step between the ends of the adjacent segments whereby, in use, a tapering gap is produced between at least the lifting area of each segment face and the confronting sealing face of said other member, which converges towards the trailing end of each segment, the means for forming a fluid seal between the seal ring and the housing comprises a narrow land on that side-face of each of the segments which lies on the lower pressure side of the seal ring, said land contacting a confronting sealing face on the housing and providing a fulcrum to allow tilting of each pad relative to the housing, and at least one of the overlapping surfaces of the segments is contoured to provide a second fulcrum to allow said tilting to take place.

2. A non-contacting seal as claimed in claim 1 and in which the seal is a radial seal having radially extending side-faces and the narrow land extends chordally along the length of each segment.

3. A non-contacting seal as claimed in claim 1 and in which the seal is a face seal having axial side-faces and the narrow land extends circumferentially around each segment.

* * * * *